G. W. BROWN.
SEED PLANTER.
No. 46,615. Patented Feb. 28, 1865.
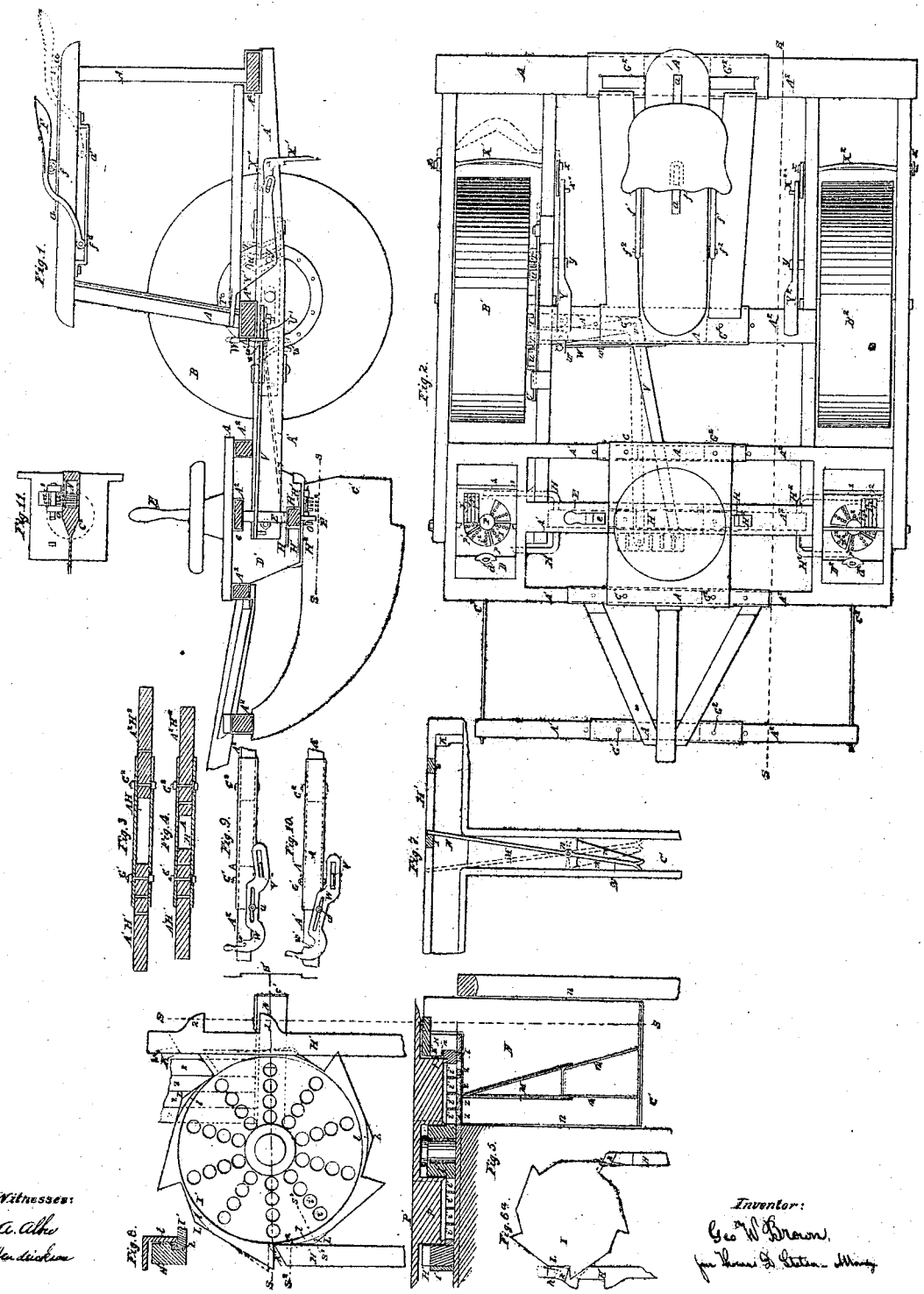

UNITED STATES PATENT OFFICE.

GEORGE W. BROWN, OF GALESBURG, ILLINOIS.

IMPROVEMENT IN SEED-PLANTERS.

Specification forming part of Letters Patent No. 46,615, dated February 28, 1865.

*To all whom it may concern:*

Be it known that I, GEORGE W. BROWN, of Galesburg, in the county of Knox, in the State of Illinois, have invented certain new and useful Improvements in Machines for Planting Seed; and I do hereby declare that the following is a full and exact description thereof.

The accompanying drawings form a part of this specification. The perspective view exhibits the general appearance of the machine and positions of the operators when it is used to plant in check-rows. The remaining figures exhibit the details of the machine.

Figure 1 represents a longitudinal vertical section of the entire machine on the line S S in Fig. 2, on a scale of about two inches to the foot. Fig. 2 is a plan view of the entire machine. In both these figures the seed-hoppers are represented as with their covers removed. I employ covers of the usual character. Fig. 3 is a cross-section showing the construction of one of the adjustable connections, which are adjusted by changing the positions of the bolts so as to widen and narrow the entire machine, including the reciprocating seed-bar H H' H$^2$. Fig. 4 is a corresponding section, showing the same connection as it appears after the machine has been adjusted for planting rows nearer together. Fig. 5 is a vertical section through the parts which lie in the base of the right seed-hopper, on a scale about half size. This section is on the line S' S' in Fig. 6. Fig. 6 is a plan view representing some of the same parts. In this view the cap shown in Figs. 2 and 5, and the springs which serve as cut-offs for the seed are supposed to have been removed. Fig. 7 is a cross-section of the same and also of the main portion of the seed-tube on the plane indicated by the line S S in Fig. 6. Fig. 8 is an attempt to represent another relation or condition of the parts. It is a section of two small portions of the same parts on two different lines to show the mode in which they match together at certain periods. The portion of the fork H' is on the line S$^2$ S$^2$ in Fig. 6, and the portion of the seed-wheel I' is on the line S$^3$ S$^3$ in the same figure. Fig. 9 is a front view of a portion, showing the controlling-slide W in the position for holding the drill mechanism out of use. Fig. 10 is a corresponding view, showing the slide in the position for allowing the drill mechanism to be operated and adjusted. Fig. 11 is a view of the under side of one of the seed-boxes. It is a section on the line S S in Fig. 1, looking from below upward.

Similar letters of reference indicate like parts in all the figures.

Tints are used to aid in distinguishing parts, and do not indicate the materials intended, which may be wood and iron.

My invention relates to means for allowing the driver to shift his weight forward and backward on the machine; for adapting the machine for wider and narrower spaces between the rows; for transferring the seed from the hoppers to the seed-tubes; for adapting the machine to plant in drills or in hills without check-rowing; for disconnecting the drill mechanism when planting in check-rows, and for scraping the surfaces of the drums or supporting-wheels.

To enable others skilled in the art to make and use my invention, I will proceed to describe it by the aid of the drawings and of the letters of reference marked thereon.

A' is the right side or the right half of the framing. A$^2$ is the corresponding left half, and A A, &c., are intermediate portions of the framing which connects these parts. The peculiarity of the construction in connection with the parts A A' A$^2$ will be described farther on. The forward portion of the framing, which carries the runners and seed-hoppers, is connected to the main portion of the framing by a joint or axis in the manner described in my patent dated May 8, 1855. The bolt which forms the axis extends through the seed-boxes, as indicated.

B' B$^2$ are the cylindrical drums or supporting-wheels. C' C$^2$ are the seed-tubes in the runners, and D' D$^2$ are the seed-hoppers. E is a lever adapted to be operated by hand and to communicate the proper motion to the planting mechanism when planting in check-rows. All these parts are similar in their general construction and operation to corresponding parts described in the patent before referred to.

The elevated ways $a$ are firmly supported in the fixed framing in the manner represented.

F is a movable seat, which is supported on a roller, $f$, and on which the driver may move himself forward and backward on the ways $a$ with great facility. The seat F is supported in its proper position by the side arms, $f'$, and the roller $f^2$, which extends across under the longitudinal piece $a$, and is kept up to its proper position by the slight additional longitudinal piece a'.

The several pieces marked A may be made of cast-iron. They inclose the inner ends of rectangular cross-pieces of the framing A' A² in the manner represented plainly in Figs. 1, 2, 3, 4, 9, and 10. The inclosed cross-pieces are provided with two or more holes, and by removing the bolts G' G² both the side frames, A' A², with their several attachments, may be moved bodily inward or made to approach each other until a different series of holes in A' and A² coincide with the holes in A and receive the bolts G' G². The transverse reciprocating bar H H' H², which is operated by the hand-lever E, is similarly constructed, so that the inner ends of the side pieces, H' H², may be correspondingly moved and secured within the central part, H. On tightening the nuts on these bolts G' G² in their new positions the entire framing A A' A² and the cross-bar H H' H² are all again made rigid, and the machine is adapted again to operate, but planting in rows nearer together than before. The reverse operation widens the machine and correspondingly widens the spaces between the rows. The transverse reciprocating bar H H' H² carries at each end forks, the form of which is indicated in Figs. 1, 2, 5, 6, 7, and 8.

The seed is measured off and transferred from the seed-hoppers into the seed-tubes by means of horizontal wheels I' I², which are shaped as represented, and are adapted to receive the seed in perforations or seed-cups $i'$ $i^2$, and by the rotation of these wheels to carry the contents of the cups under suitable cut-offs, J' J², to deliver into the seed-tubes. These wheels I' I² are operated with a positive motion just far enough and no farther at each movement of the hand-lever E in either direction. The lever E, being pulled by the operator, turns on its fulcrum $e$ and carries the reciprocating bar H H' H² to the right. This movement gives a partial rotation to both wheels I' I². It effects this by thrusting the forward arm of the fork H' against one of the teeth of the wheel I' and by pulling the hook or shoulder on the rear arm of the fork H² against one of the teeth of the wheel I². The return movement of the hand-lever E moves the bar H H' H² in the opposite direction, and gives an equal further motion to both the seed-wheels I' I² by the thrusting of the forward arm of the fork H² against a tooth of the wheel I² and by the drawing action of the rearward arm of the fork H', which is provided with a shoulder or hook, K', corresponding to the before-described hook. The wheels I' and I² are by these operations turned equally at each movement of the lever E.

The form given to the teeth or projections on the seed-wheels I' I² and to the parts of the forks H' H² which come in contact therewith is very important and requires a very particular explanation. When the movement of the bar H H' H² in either direction is effected rapidly the inertia of the wheels I' I² tends to continue their motion and throw them too far around and cause the wheels to come to rest in a false position. I avoid this evil by causing certain obtuse angles or slight projections on the wheels I' I² to strike at the proper time and rest fairly against the inner faces of the forks H' H². The Figs. 5, 6, 7, and 8 indicate the exact forms of these parts half size. The wheels I' I² are about a half-inch in thickness at the periphery. The upper half of this thickness is differently formed at the periphery from the corresponding part of the lower half, and performs a different function. The lower half presents angles in this part which are designated L. The corresponding points on the upper half are rounded, and are distinguished by the letter $l$. The form of the inner faces of the arms of the forks H' H² is also important. At the points on the inner surfaces of the forks H' H² which at the end of each of the sudden movements lie opposite to the slight projections or obtuse angles L the fork has a perpendicular face extending its full depth; but when the succeeding or return movement of the bar H H' H² has progressed a little way a recess, $h$, which is formed, as represented, on each inner face of the forks H' H², is presented to the corresponding angle, L, and the angle enters it, thus allowing the wheel to turn freely again in obedience to the impulse which it then commences to receive from the other arm of the fork, and thus the operation proceeds with certainty and precision.

P' P² are castings which serve as covering plates or caps for my seed-wheels I' I². The openings therein to present the seed to the seed-wheels extend around nearly the entire working-surfaces of the latter. There is a broad projection extending over that part of the wheel where the seed is delivered to the seed-tubes; and $p'$ $p^2$ are slender arms or agitators cast upon the caps and standing in the positions represented. Each entire cap, with the several projections referred to and the attached cut-off J' or J², is removable on turning the corresponding wedge-shaped button, $d'$ or $d^2$, and raising the cap on that side, so as to draw it out in the obvious manner.

The office of my cut-offs J' J² is to form a yielding or elastic bar to separate the seed in the seed-cups from their companions as the revolution of the seed-wheels present them thereto. I employ elastic plates of metal for the purpose. There are four seed-cups which are to be thus treated at the same time in each seed-wheel, and I provide four corresponding springs or cut-offs, arranged as represented by J', &c., J², &c.

The seed-tubes C' C² are formed in the widened rear ends of the runners. M is a fixed partition standing therein in the position represented, and the vibrating valve or flipper N is correspondingly divided to adapt itself thereto. The upper extremity of each flipper is urged in opposite directions by the projections 1 and 2 on the rear arm of the corresponding forked part at each "half movement" or change of position of the bar H H' H² from one extreme position to the other, and performs the same duties as in my former patent above referred to. The fixed partition M is made of sheet metal, as represented, and is thin at its upper edge. Each is so placed as to receive the seed from some of the seed-cups $i'$ $i^2$ on its front side and the seed from others on its rear side. They increase in thickness below, so as to separate the seed in front a considerable distance from the seed in the rear of the partition. A continuation, $m$, of the partition below the pivot $n$ is matched into the fixed part M, and is narrowed in the transverse direction at the base, as represented in Fig. 7. It is fixed on and vibrates with the flipper N. I thus avoid dividing the latter at the bottom. The two quantities of seed may be separated by this means to any distance desired, within reasonable limits, by using very capacious seed-tubes and modifying the form of the lower parts of the partitions, as will be obvious to mechanics. I prefer to divide it about two inches, as indicated in the drawings.

Z Z, &c., are slides which may be readily adjusted by the attendant. They are adapted each to cover a portion of the top of its respective seed-tube and to prevent the dropping of any seed from one corresponding seed-cup $i'$ $i^2$. It will be observed that these slides coincide in position with the four seed-cups which deliver at the same time, and in practice I have found that with the proportions and arrangement indicated but one grain of corn is ordinarily carried in each seed-cup. The four seed-cups in each wheel which deliver simultaneously are all arranged in radial series. The several slides Z are adapted to close three in each series and prevent the seed therein from dropping out. I provide a narrow slide, $z$, adapted to but partially cover the remaining cup in each series, and I provide a transverse slide, O, adapted to lock either or all the slides in either the open or shut position, as desired. It effects this by standing in contact with knobs or projections on the under side of the latter, as represented. By drawing out all the slides I plant four grains of corn in each hill. If I slide in one of the slides Z, I plant but three grains in each hill. The drawing represents all the slides forced in, and my machine may by such means be adjusted to plant no corn at all. The narrow slide $z$ is sufficiently wide to stop a grain of corn, and either of the slides may be opened or closed with equal effect in planting corn.

It is sometimes desirable to plant seeds which are considerably smaller than corn. In such case one of my small seed-cups alone may contain a sufficient quantity, in which case I close the three slides Z Z Z and leave one, $z$, open. In some cases—as, for example, in planting broom-corn, sorghum, &c.—even one entire seed-cup may contain too large a quantity of such seed, and it is desirable to be able to retain a part of the contents of a cup and deliver into the seed-tube the remainder. I accomplish this by the aid of my narrow slide $z$, which is only wide enough to close about two-thirds of the corresponding seed-cup. By pushing in or closing all the slides I plant at each motion of the bar H only about half of the contents of the seed-cup which is partially covered by the narrow slide $z$. This accomplishes the end very satisfactorily. I can, if desired, make the slide $z$ longer and capable of more motion and of several adjustments, and make the same of several different widths at different points, or of a uniformly-tapered form from one end to the other. I can then, by adjusting the slide, graduate the opening for the passage of small seeds past such slide, so as to plant more or less at pleasure; but I do not in practice consider it necessary to do so.

I will now describe the parts by which I operate these wheels automatically and very rapidly when planting in drills. The distance apart at which the seed may be deposited in the rows or drills by the aid of my invention may be determined with great accuracy, and a variety of distances may be selected. I usually construct the machine so that the seed may be dropped at either of the following distances apart: eight and one-half inches, fourteen inches, twenty-one inches, and forty-two inches. The variations in the distances are produced by varying the number of pins, which are arranged in a circular series on the inner face of the wheel B'.

T are the pins referred to. They are firmly set by screwing them tightly in corresponding holes, $t$, in a stout metal ring. These holes are distributed so that on reducing the number of pins the remainder may be equally distributed around the entire circle.

U is a yoke or slide adapted to reciprocate forward and backward, according as its inclined faces $u$ are alternately acted on by the pins T. Anti-friction wheels are provided to aid in reducing the resistance to its motion.

V is a bell-crank lever, mounted on a fixed fulcrum, $v$, and adapted to reciprocate in the horizontal plane, according as the yoke U is operated. The long arm of this lever extends forward, and is adapted to be connected at pleasure to the seeding apparatus by dropping its extremity into a slot in the part H. In this condition the machine is driven forward, and the action of the pins T induces a vibrating motion of the bell-crank lever V, and consequently a succession of reciprocations of the seeding devices and corresponding movements of the seed-wheels I' I². It will of course be observed that if a sufficient quantity of seed is dropped in this manner at proper distances apart the effect will be very nearly equivalent to the planting by hand. The difference is that in this drilling or automatic planting last described the hills are not arranged in check-rows, and the corn cannot consequently be cultivated by cross-plowing; but by disconnecting these parts and operating by the hand-lever E, instead of by my drilling mechanism, the hills may be check-rowed very accurately.

When planting by the aid of the hand-lever E it is well not only to disconnect the lever V by lifting its forward extremity out of the slot H, but also to prevent the lever V from vibrating at all. I accomplish this by the aid of the slide or sliding lever W. This latter is slotted to receive the lever V, and is adapted to turn slightly as it slides upon the bolt $w$, which latter is fixed in the frame-work. On leaving this sliding lever W at liberty it assumes a position in which it becomes of no effect; but on drawing it forcibly to the right and thrusting its right extremity under the stop or hook $w'$, which is fixed on the framing, it holds the lever V in such a position that its inclined faces $u$ $u$ are carried too far forward to be touched, and the pins T traverse freely around without coming in contact with anything. This is the condition represented in Figs. 1 and 2.

$X'$ $X^2$ are scrapers mounted on eyes $x$, so that they are free to turn. $Y'$ $Y^2$ are levers connected therewith in the manner represented, and free to turn on the fixed fulcra $y$. The forward ends of these levers are within reach of the operator, and by placing his foot on either or on both at once the corresponding scrapers may be pressed with sufficient force against the peripheries of their respective wheels. On removing the foot the gravity of the parts induces a removal of the scrapers to a little distance, as represented. The levers $Y'$ $Y^2$ may be dispensed with, if desired, by extending the arms $X^*$ $X^{**}$ backward instead of forward from the eyes $x$ and applying the foot or other force directly thereto; but I prefer the arrangement shown.

It will be observed that, while my parts A embrace and completely encircle the inner ends of the transverse pieces $A'$ $A^2$, it is not essential to the tightness of the fitting together of the parts that $A'$ $A^2$ shall be exactly equal in size to the interior of the casting A, because the nuts and washers which are fitted on the bolts $G'$ $G^2$ do not bear against the cross parts of the box-casting A, but are let up into the large cavities therein, so as to bear directly against the wood $A'$ $A^2$ and hold the whole very firmly.

It will be perceived that by duplicating the partitions M $m$ a separate seed-passage or seed-tube may be provided from each of the seed-cups which deliver simultaneously, so that the contents of each may thereby be separated with certainty and to a fixed distance each from the other.

Pawls or springs may be used on the inner faces of the forks $H'$ $H^2$, if preferred, in addition to the devices shown, in order to render the action of the same on the teeth of $I'$ $I^2$ more certain; but I have not found such necessary in practice.

Some of the advantages due to certain features of my invention may be separately enumerated as follows:

First, by reason of my traversing seat F, wheels $f$ and $f^2$, and guides $a$ and $a'$, the driver is able to shift his weight forward and backward with less friction and to maintain a better seat in either position than in my patent of 1855, above referred to, or any other known to me.

Second, by reason of my construction of the framing in three distinct parts or sets of parts, A $A'$ $A^2$, applied together and secured in the manner represented, I am able to widen and narrow my frame with great facility and very uniformly and to hold the parts very rigidly when secured in the several positions.

Third, by reason of my metal socket H and adjustable end pieces, $H'$ $H^2$, in the seed-bar used, in combination with corresponding provisions for widening and narrowing the frame, I am able to readily widen and narrow not only the frame, but also the entire machine and all the mechanism thereof.

Fourth, by reason of my employment of seed-wheels operated, performing complete revolutions by increments, worked by hand, and arranged in the manner shown, I am able to plant by the same movements of the lever E as in my patent of 1855, and realize the same advantages therefrom, and can expose the seed-cups for a longer period to receive the seed.

Fifth, by reason of my seed-dropping wheels and the forks on the seed-bar, arranged to operate together as described, I am enabled to give the desired progressive motion to the rotating wheels with very simple movements, and movements to which farmers have become accustomed by the use of other machines, so that very little practice is required to operate my machine successfully.

Sixth, by reason of my construction and arrangement of the pins T, yoke U, lever V, sliding lever W, and stop $w'$, I am able, with little labor and very simple means, to disconnect the drill mechanism and hold it motionless, so as to prevent its working uselessly.

Seventh, by reason of my construction and arrangement of the parts $y$ X $Y'$ $Y^2$, whereby the V-shaped wheel-scrapers $X'$ $X^2$ are supported and operated independently each of the other, I am able to bring either or both into and out of action at will with very little effort, and I produce no resistance and induce no wear of the parts, except on the wheel, which may require to be scraped.

Having now fully described my invention, what I claim as new therein, and desire to secure by this patent, (marked A,) is as follows:

1. In combination with a seed-planting machine having its seeding devices forward of the center of the wheels, a movable seat, F, with wheels $f$ and $f^2$ and guides $a$ and $a'$, for the purpose described.

2. In combination with the operative parts of a seed-planting machine, the metal sockets A, constructed as shown, and arranged for use in combination with the side frames, $A'$ $A^2$, for the purpose of widening and narrowing the machine in the manner and for the purpose specified herein.

3. The employment of a corresponding metal socket, H, and adjustable side parts, $H'$ $H^2$, in combination with a frame, A $A'$ $A^2$, or its equivalent, so that the seed-bar shall be shortened and lengthened to correspond with the changes in width of the frame, substantially as herein specified.

4. In a continuously-progressing seed-planting machine wherein the seed-dropping mechanism is operated by an attendant, in contradistinction to automatic dropping, the operating of horizontal seed-wheels by hand, so as to make complete revolutions by increments, substantially in the manner and for the purposes herein set forth.

5. In seed-planting machines, the employment of a seed-dropping wheel and operating-fork, combined and arranged as herein represented and described, so that the movement of the fork in one direction will act on the wheel to turn it to a certain extent in a certain direction and the movement of the fork in the opposite direction will act on the wheel to turn it to a certain extent in the same direction as before, thus turning the wheel by increments around in one uniform direction by reciprocating movements of the fork, as herein set forth.

6. In such machine, holding the drill mechanism at rest by carrying the inclines $u$ beyond the range of the pins T, substantially in the manner and for the purpose herein set forth.

7. In combination with a seed-planting machine carried on wheels, the employment of two independently operated V-shaped scrapers, $X'$ $X^2$, which are severally forced against and released from the supporting-wheels at the will of the operator by means of treadles $Y'$ $Y^2$, connected and arranged to operate substantially as and for the purpose herein set forth.

GEO. W. BROWN.

Witnesses:
S. G. CUMMINGS,
THOMAS D. STETSON.